(12) United States Patent
Tanaka et al.

(10) Patent No.: US 6,627,869 B2
(45) Date of Patent: Sep. 30, 2003

(54) BEAM SHAPER, AND SEMICONDUCTOR LASER SOURCE DEVICE AND OPTICAL HEAD USING THE BEAM SHAPER

(75) Inventors: Yasuhiro Tanaka, Ashiya (JP); Michihiro Yamagata, Osaka (JP); Tomohiko Sasano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/131,720

(22) Filed: Apr. 24, 2002

(65) Prior Publication Data

US 2002/0166952 A1 Nov. 14, 2002

(30) Foreign Application Priority Data

Apr. 24, 2001 (JP) .......................... 2001-125731

(51) Int. Cl.[7] .................................................. H01J 3/14
(52) U.S. Cl. ....................................... 250/216; 359/711
(58) Field of Search ................................ 250/216, 234, 250/235, 201.5; 359/711, 710, 718, 719, 631, 641

(56) References Cited

U.S. PATENT DOCUMENTS

| 4,915,484 A | 4/1990 | Yamamoto |
| 5,467,335 A | 11/1995 | Braat |
| 5,805,260 A | * 9/1998 | Roffman et al. ............. 351/161 |
| 6,075,650 A | 6/2000 | Morris et al. |

FOREIGN PATENT DOCUMENTS

| JP | 61-254915 A | 11/1986 |
| JP | 1-109317 A | 4/1989 |
| JP | 1-244421 A | 9/1989 |
| JP | 6-294940 A | 10/1994 |
| JP | 9-258099 A | 10/1997 |

* cited by examiner

*Primary Examiner*—Que T. Le
(74) *Attorney, Agent, or Firm*—Merchant & Gould, P.C.

(57) ABSTRACT

A beam shaper is made up of a single lens whose both surfaces are toric surfaces. Assuming that directions where the beam divergence angle are larger and smaller in the far field from the semiconductor laser source are referred to as the vertical and horizontal directions, respectively, both of the toric surfaces have aspheric surfaces in a cross-section in the vertical direction, both of the toric surfaces have spherical surfaces in a cross-section in the horizontal direction, and both centers of curvature of the spherical surfaces are located substantially at a luminous point of the semiconductor laser source.

11 Claims, 7 Drawing Sheets

BEAM SHAPER, AND SEMICONDUCTOR LASER SOURCE DEVICE AND OPTICAL HEAD USING THE BEAM SHAPER

BACKGROUND OF THE INVENTION

1. Field of the Invention

The present invention relates to a beam shaper, and a semiconductor laser source device and an optical head, both using the beam shaper. More specifically, the present invention relates to a beam shaper that can convert a luminous flux emitted from a semiconductor laser source, whose beam divergence angle is different in the horizontal direction and the vertical direction, into a luminous flux having a smaller difference between the beam divergence angles, and a semiconductor laser source device and an optical head, both using the beam shaper.

2. Related Background Art

The distribution of light quantity of a beam emitted from a semiconductor laser has an elliptical shape. This is because the beam divergence angle is larger in the vertical direction but smaller in the horizontal direction. In a device provided with a semiconductor laser as its light source, for example, in an optical disk device, the spot size of a beam collected by an objective lens should be narrowed to be as small as possible. Therefore, it is preferable that the distribution of light quantity is uniform as much as possible. The distribution of light quantity can be made uniform by using only light located in the vicinity of the center of the semiconductor laser. To do so, however, a large amount of light emitted from the semiconductor laser has to be eliminated, which would deteriorate the efficiency of laser power. This deterioration becomes a significant problem for rewritable optical disk devices.

To cope with the above problem, several methods have been employed to convert the distribution of light quantity having an elliptical shape in a semiconductor laser into a more circular shape. For instance, in known devices, a light beam emitted from a semiconductor laser is converted into a parallel beam with a collimator lens, and then the distribution of light quantity shaped like an ellipse is converted into a circular shape with two assembled prisms. This construction, however, necessitates a space for arranging the prisms subsequent to the collimator lens, which makes the optical system larger. As a solution thereof, JP61(1986)-254915 A, JP1(1989)-109317 A, and JP9(1997)-258099 A each propose an optical device combining the functions of a beam shaper and a collimator lens. These proposed devices, however, have problems in that their aberration correction is insufficient, their positioning tolerance is extremely tight, and also it is difficult to machine such devices because of the complexity of their surface configuration. Further, JP6 (1994)-294940 A proposes an optical device having a beam shaping function only, aside from a collimating function. More specifically, this optical device has a cylindrical surface at a side of a semiconductor laser and a toroidal surface located opposite thereto. This construction, however, has a problem in that the aberration changes considerably with respect to displacement in a relative position between the light source and the optical device and therefore a high degree of location accuracy is required.

SUMMARY OF THE INVENTION

Therefore, with the foregoing in mind, it is an object of the present invention to provide a beam shaper with a small aberration variation and a high positioning tolerance, and to provide a semiconductor laser source device and an optical head by which the efficiency of laser power can be improved.

To achieve the above object, the beam shaper according to the present invention, which converts a luminous flux emitted from a semiconductor laser source whose beam divergence angle is different in a horizontal direction and a vertical direction into a luminous flux having a smaller difference, where a beam divergence angle in a far field from the semiconductor laser source is larger in the vertical direction and smaller in the horizontal direction, includes a single lens whose both surfaces are toric surfaces. Here, both of the toric surfaces have aspheric surfaces in a cross-section in the vertical direction, both of the toric surfaces have spherical surfaces in a cross-section in the horizontal direction, and both centers of curvature of the spherical surfaces are located substantially at a luminous point of the semiconductor laser source.

With this configuration, a beam shaper whose positioning tolerance is high in both cross-sections in the horizontal direction and the vertical direction, and whose wavefront aberration as a whole is small can be realized. In addition, since both surfaces of the beam shaper in one cross-section are spherical, it becomes relatively easy to machine such a beam shaper, as compared with a beam shaper whose both surfaces in both cross-section are aspheric surfaces.

In the aforementioned configuration of the beam shaper, it is preferable that the toric surfaces in the cross-section in the vertical direction are a convex surface at the side of the semiconductor laser source and a concave surface at the side opposite to the semiconductor laser source. With this preferred example, a beam shaper whose positioning tolerance is high and whose wavefront aberration as a whole is small can be realized.

In addition, in the aforementioned configuration of the beam shaper, it is preferable that the following Formula 1 is satisfied:

[Formula 1]

$$1.2 < NAy/NAx < 3.0$$

where $NAx$ and $NAy$ represent numerical apertures, which the beam shaper can take in from the semiconductor laser source, in the cross-sections in the horizontal direction and the vertical direction, respectively. When falling below the lower limit in Formula 1, that is, when the value of $NAy/NAx$ is 1.2 or less, the degree of correction is lowered, which would deteriorate a laser capture efficiency. On the other hand, when exceeding the upper limit in Formula 1, that is, when the value of $NAy/NAx$ is 3.0 or more, a power of the beam shaper in the vertical cross-section becomes too large, which makes the positioning tolerance tighter, and thus leads to a practical problem.

The semiconductor laser source device according to the present invention includes a semiconductor laser source and a beam shaper, where a beam divergence angle in a far field from the semiconductor laser source is larger in a vertical direction and smaller in a horizontal direction, and the beam shaper includes a single lens whose both surfaces are toric surfaces. Here, both of the toric surfaces have aspheric surfaces in a cross-section in the vertical direction, both of the toric surfaces have spherical surfaces in a cross-section in the horizontal direction, and both centers of curvature of the spherical surfaces are located substantially at a luminous point of the semiconductor laser source. With this configuration, a semiconductor laser source device with a high efficiency of laser power can be realized.

In the aforementioned configuration of the semiconductor laser source device, it is preferable that the device further includes a collimator lens that converts a luminous flux emitted from the beam shaper into a parallel beam. With this preferred example, a semiconductor laser source device producing a high-quality parallel beam can be realized. In addition, in this case, it is preferable that an aberration correction for the collimator lens is made when the beam shaper is inserted between the collimator lens and the semiconductor laser source. With this preferred example, a laser beam emitted from the semiconductor laser source device can be converted into a parallel beam without being affected by the beam shaper very much.

In addition, in the aforementioned configuration of the semiconductor laser source device, it is preferable that the toric surfaces in the cross-section in the vertical direction are a convex surface at the side of the semiconductor laser source and a concave surface at the side opposite to the semiconductor laser source.

Further, in the aforementioned configuration of the semiconductor laser source device, preferably, the following Formula 2 is satisfied:

[Formula 2]

$$1.2 < NAy/NAx < 3.0$$

where NAx and NAy represent numerical apertures, which the beam shaper can take in from the semiconductor laser source, in the cross-sections in the horizontal direction and the vertical direction, respectively.

In addition, in the aforementioned configuration of the semiconductor laser source device, preferably, the beam shaper is made of resin, and the semiconductor laser source and the beam shaper are fixed with a resin lens barrel. In the case of a beam shaper fabricated by plastic molding, an astigmatism would occur due to temperature change. If the semiconductor laser source and the beam shaper are fixed with a resin lens barrel having an adequate length, generation of the astigmatism can be suppressed.

The optical head according to the present invention includes a semiconductor laser source device, collecting means for collecting light emitted from the semiconductor laser source device onto an information medium, light splitting means for splitting the light modulated on the information medium, and light-receptive means for receiving the light modulated on the information medium. With this configuration, the number of components can be decreased, and a low cost optical head that is easily assembled can be provided. In addition, since the efficiency of laser power emitted from the semiconductor laser can be improved, recording speed can be increased and the power of the semiconductor laser source can be lowered, in particular, in rewritable optical disks.

DETAILED DESCRIPTION OF THE INVENTION

The following describes embodiments of the present invention in detail.

Figure 1:
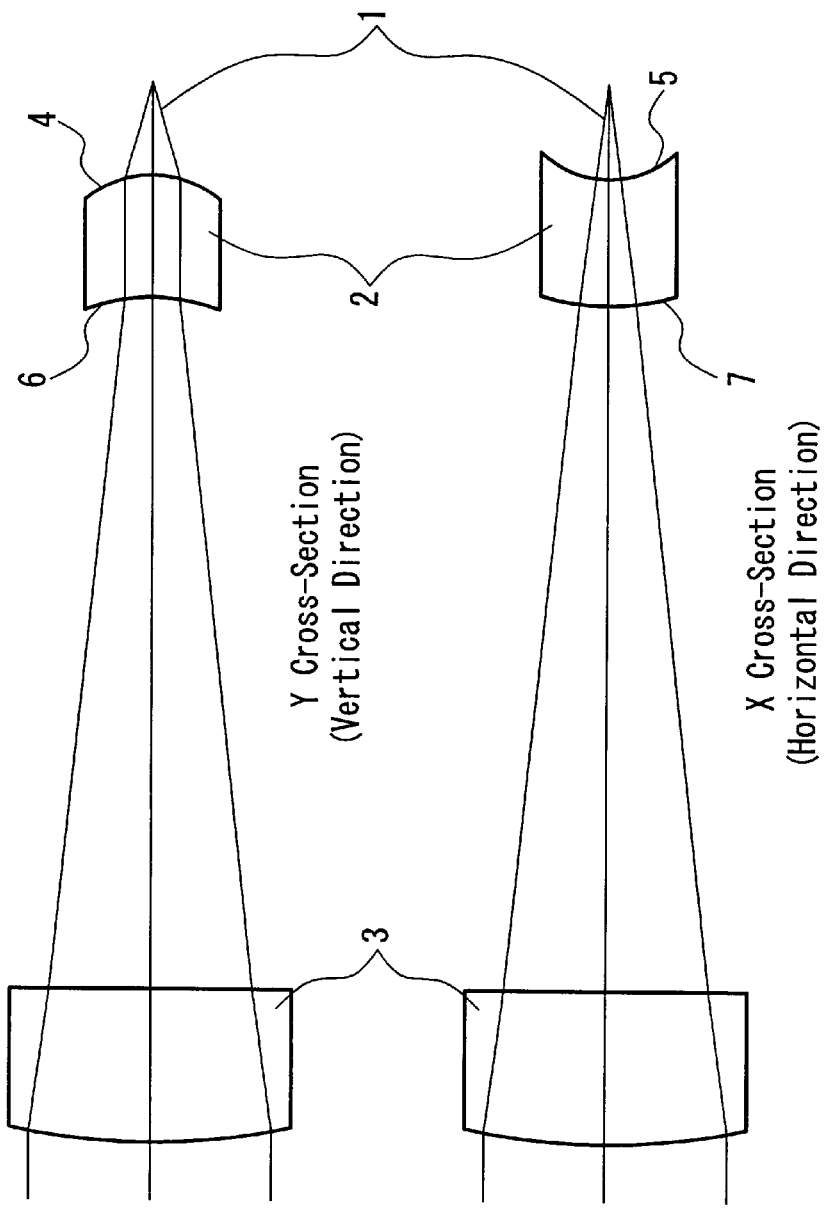
FIG. 1 is a schematic diagram showing a configuration of a semiconductor laser source device using a beam shaper according to one embodiment of the present invention.

FIG. 1 is a schematic diagram showing a configuration of a semiconductor laser source device using a beam shaper according to one embodiment of the present invention. Note that in this embodiment, a cross-section where the beam divergence angle is larger in the far field relative to the semiconductor laser source, i.e., a cross-section in the vertical direction, is referred to as "Y cross-section", whereas a cross-section where the beam divergence angle is smaller, i.e., a cross-section in the horizontal direction, is referred to as "X cross-section".

As shown in FIG. 1, a light beam emitted from a semiconductor laser source 1 passes through a beam shaper 2 and then is converted into a parallel beam with a collimator lens 3. Here, since the divergence angle of the beam emitted from the semiconductor laser source 1 as a light source is large in the Y cross-section, a laser beam larger in the numerical aperture (NA) has to be taken in by the beam shaper 2. On the other hand, in the X cross-section, a laser beam corresponding to the NA of the collimator lens 3 may be taken in by the beam shaper 2.

The beam shaper 2 is made up of a single lens that has a convex surface at the side of the semiconductor laser source 1 and a concave surface located opposite thereto in the Y cross-section. Further, at the side of the semiconductor laser source 1, the beam shaper 2 has toric surfaces that are aspherical in the Y cross-sectional shape 4 and spherical in the X cross-sectional shape 5. In addition, at the side opposite to the semiconductor laser source 1, i.e., at the side of the collimator lens 3, also, the beam shaper 2 has toric surfaces that are aspherical in the Y cross-sectional shape 6 and spherical in the X cross-sectional shape 7.

In the X cross-section, the centers of curvature of the cross-sectional shape 7 (spherical surface) and the cross-sectional shape 5 (spherical surface) are both located in the vicinity of the semiconductor laser source 1. Therefore, a laser beam emitted from the semiconductor laser source 1 hardly is refracted at either the cross-sectional shape 7 (spherical surface) or the cross-sectional shape 5 (spherical surface) but is incident on the collimator lens 3. As a result, if the aberration correction for the collimator lens 3 is sufficient, the laser beam emitted from the semiconductor laser source 1 can be converted into a parallel beam without being affected by the beam shaper 2 very much.

In the Y cross-section of the beam shaper 2, the light beam emitted from the semiconductor laser source 1 needs to be refracted in order to capture a larger amount of light. When only one surface of the beam shaper 2 in the Y cross-section is made aspherical, the axial spherical aberration can be corrected. However, if both surfaces are made aspherical so as to utilize the flexibility of these two aspheric surfaces, the aberration generated with the movement of the beam shaper 2 in the optical axis direction can be lowered. In addition, by making both surfaces aspheric in the cross-section where the beam divergence angle is larger in the far field from the semiconductor laser source 1 as in this embodiment, a device having a relatively loose positioning tolerance can be realized. Furthermore, by making both surfaces spherical in the cross-section where the beam divergence angle is smaller in the far field from the semiconductor laser source 1 as in this embodiment, the device can be machined easily.

According to the above-stated method, the spherical aberrations in the X cross-section and Y cross-section can be corrected. Practically, however, the aberrations not only in respective cross-sections but also in the lens as a whole need to be corrected. In this respect, the aberration in the lens as a whole can be suppressed by, as stated above, arranging the beam shaper 2 in such a manner that the centers of the curvature of the cross-sectional shape 7 (spherical surface) and the cross-sectional shape 5 (spherical surface) of the beam shaper 2 in the X cross-section are both located in the vicinity of the semiconductor laser source 1.

In addition, assuming that numerical apertures (NAs) that the beam shaper 2 can take in from the semiconductor laser source 1 in the X cross-section and Y cross-section are NAx and NAy, respectively, it is preferable to satisfy the condition in the following Formula 3.

[Formula 3]

$$1.2 < NAy/NAx < 3.0$$

The NAy/NAx in the above Formula 3 indicates a so-called compensation magnification of an elliptical beam. When this value equals to one, no correction is made to the beam. Here, if falling below the lower limit in the above Formula 3, that is, when the value of NAy/NAx becomes 1.2 or less, the degree of correction is lowered, which would deteriorate the laser capture efficiency. On the other hand, if exceeding the upper limit in the above Formula 3, that is, when the value of NAy/NAx becomes 3.0 or more, the power of the beam shaper 2 in the Y cross-section becomes too large, which makes the positioning tolerance or the like tighter and thus leads to a practical problem.

Hereinafter, examples to satisfy the above-stated condition in Formula 3 will be described. In each example, the order of the surfaces is counted from the side of the parallel beam for the sake of expediency. Also, in each example, φEFF, fx, fy, m, dc, nc, dk, ds, ns, and WD denote the following, respectively:

That is,

φEFF: effective diameter of the parallel beam emitted from the collimator lens 3, fx: focal length in the X cross-section of the optical system as a whole including the collimator lens 3, fy: focal length in the Y cross-section of the optical system as a whole including the collimator lens 3, m: compensation magnification (=fx/fy), dc: center thickness of the collimator lens 3, nc: refractive index of the collimator lens 3, dk: air space between the collimator lens 3 and the beam shaper

2, ds: center thickness of the beam shaper 2, ns: refractive index of the beam shaper 2, and WD: air space between the beam shaper 2 and the semiconductor laser source 1

In addition, the collimator lens 3 may have a rotationally symmetric aspheric shape represented by the following Formula 4.

$$z = \frac{\frac{p^2}{R_{ci}^2}}{1 + \sqrt{1 - (k_{ci} + 1)\frac{p^2}{R_{ci}^2}}} + AD_{ci}p^4 + AE_{ci}p^6 \quad \text{[Formula 4]}$$

Here, assuming that X and Y coordinates on the rotationally symmetric aspheric surface are represented by (x, y), the height p from the optical axis is represented by $p^2 = x^2 + y^2$. Each notation in the above Formula 4 indicates the following:

z: distance between the point on the aspheric surface whose height from the optical axis is p and the tangent plane at the vertex of the aspheric surface, Rci: curvature radius of the i-th surface of the collimator lens 3, kci: conic constant of the i-th surface of the collimator lens 3, and ADci and AEci: the fourth and sixth aspheric coefficients of the i-th surface of the collimator lens 3, respectively In addition, an aspheric shape of the beam shaper 2 in the X cross-section is represented by the following Formula 5.

$$z = \frac{\frac{x^2}{R_{siy}^2}}{1 + \sqrt{1 - (k_{siy} + 1)\frac{x^2}{R_{siy}^2}}} + AD_{siy}p^4 + AE_{siy}p^6 \quad \text{[Formula 5]}$$

In the above Formula 5, each notation denotes the following:

z: distance between the point on the aspheric surface whose height from the optical axis is y and the tangent plane at the vertex of the aspheric surface, Rsiy: curvature radius of the i-th surface of the beam shaper 2, ksiy: conic constant of the i-th surface of the beam shaper 2, and ADsiy and AEsiy: the fourth and sixth aspheric coefficients of the i-th surface of the beam shaper 2, respectively In the following examples, the design wavelength is 405 nm, and if no data is given for the data on the aspheric surface, the value is regarded as zero.

EXAMPLE 1

φEFF=3.84
fx=14
fy=7
m=2
Rc1=9.98272
kc1=−0.6978976
ADc1=0.1260299×10$^{-4}$
AEc1=−0.1283053×10$^{7}$
dc=2.5
nc=1.62392
Rc2: a plane
dk=10.96
Rs1x=3.5
Rs1y=−3.20484
ks1y=3.133788
ADs1y=−0.3323128×10$^{-1}$
AEs1y=0.5346506×10$^{-1}$
ds=2.0 ns=1.55883
Rs2x=1.5
Rs2y=−1.0411
ks2y=−1.581877
ADs2y=0.7019697×10⁻¹
AEs2y=0.355592×10⁻²
WD=1.5

In this example, the centers of curvature of the cross-sectional shape 7 (spherical surface) and the cross-sectional shape 5 (spherical surface) of the beam shaper 2 in the X cross-section coincide with a luminous point of the semiconductor laser source 1.

Figure 2:
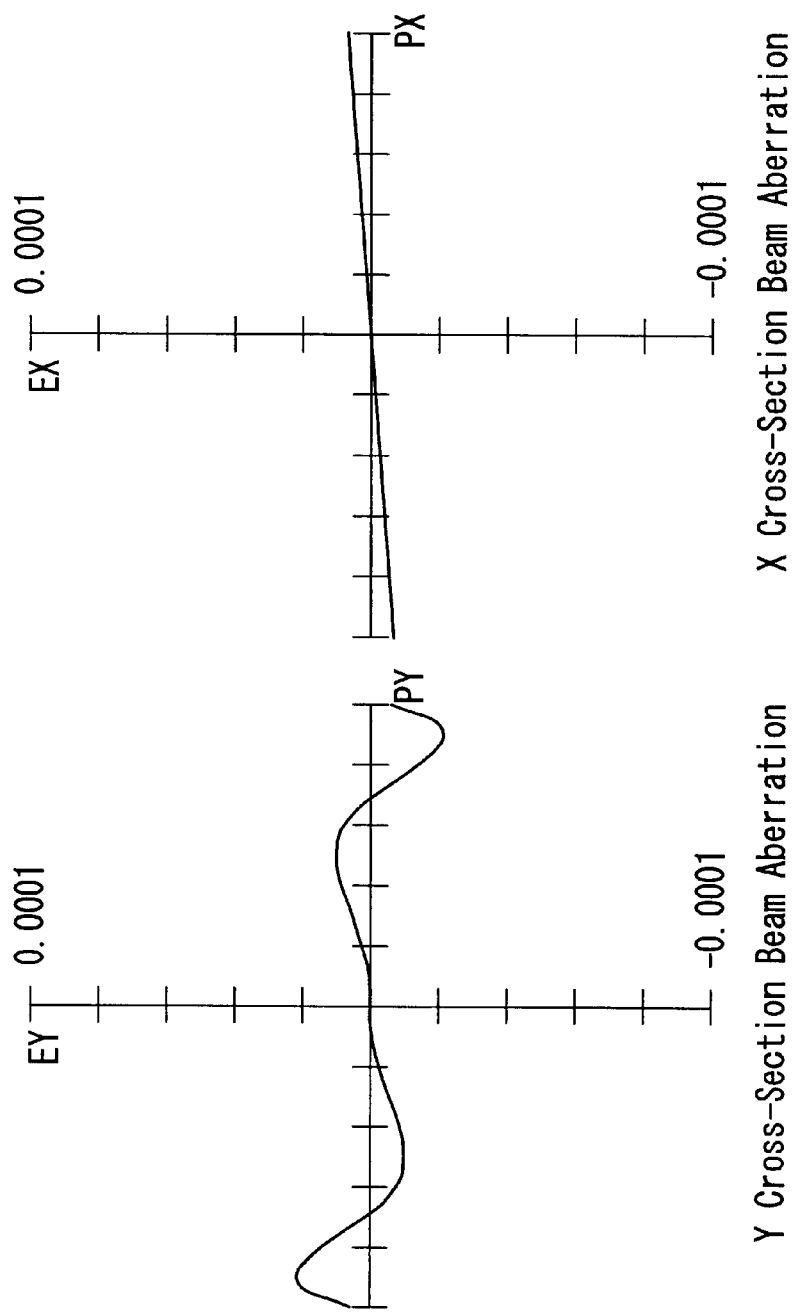
FIG. 2 shows transverse aberrations of the beam shaper according to Example 1 of the present invention.

FIG. 2 shows transverse aberrations of the beam shaper in this example. As can be seen from FIG. 2, the aberrations can be corrected sufficiently because the transverse aberrations are 0.0001 or less in both X cross-section and Y cross-section. Further, the RMS value concerning the total wavefront aberration is 0.005λ or less.

The beam shaper 2 preferably is fabricated by glass forming or plastic molding. Thereby, the beam shaper 2 can be mass-manufactured at low cost and with high precision.

Figure 6:
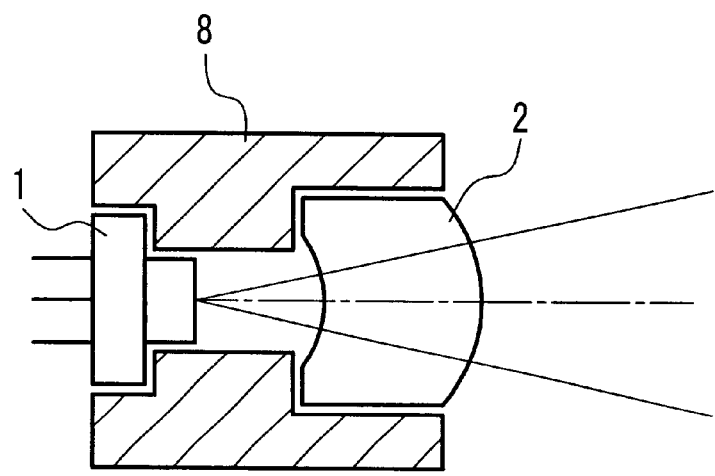
FIG. 6 is a schematic diagram showing a configuration of a semiconductor laser source device using the beam shaper in Example 1.
Figure 7:
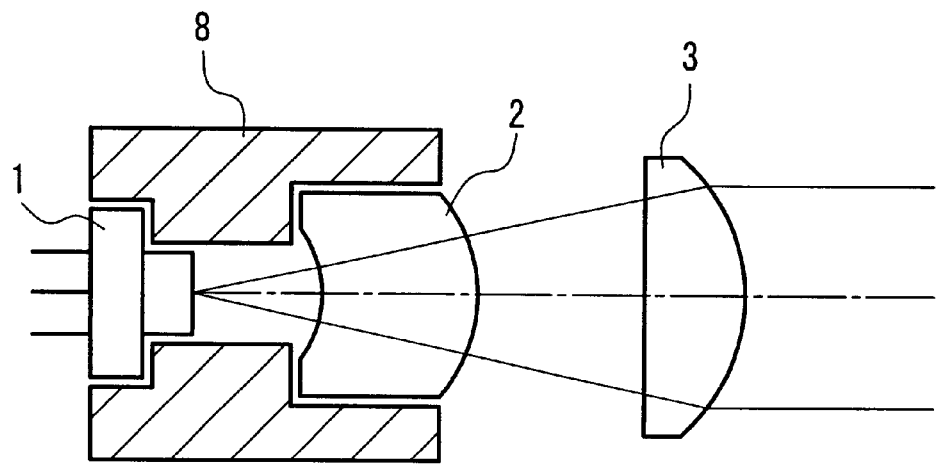
FIG. 7 is a schematic diagram showing another configuration of a semiconductor laser source device using the beam shaper in Example 1.

In the case where amorphous polyolefin resin is used as a material of the beam shaper 2, the temperature characteristic of this material is a linear expansion coefficient of 7.0×10⁻⁵ and a rate of change in the refractive index depending on temperature of −1.43×10⁻⁴. Therefore, the focal length changes with a temperature change. Since this beam shaper 2 employs toric surfaces, an astigmatism occurs as the focal point is shifted. To correct this astigmatism, a space between the semiconductor laser source 1 and the beam shaper 2 needs to be adjusted. The amount to be adjusted is approximately ±8.8 μm at ±35° C. Then, as shown in FIG. 6, the semiconductor laser source 1 and the beam shaper 2 are fixed with a resin lens barrel 8. Assuming that the linear expansion coefficient of the resin lens barrel 8 is 7.0×10⁻⁵, the amount can be adjusted to exactly ±8.8 μm at ±35° C. when the fixed space between the semiconductor laser source 1 and the beam shaper 2 is set at 3.6 mm. This configuration can provide a semiconductor laser source device that always keeps a wavefront free from an astigmatism. Further, if the collimator lens 3 is added as shown in FIG. 7, a semiconductor laser source device that always keeps a quality of the parallel beam constant can be provided.

EXAMPLE 2

φEFF=3.84
fx=16
fy=7.2727
m=2.2
Rc1=9.98272
kc1=−0.6978976
ADc1=0.1260299×10⁻⁴
AEc1=−0.1283053×10⁻⁷
dc=2.5
nc=1.62392
Rc2: a plane
dk=8.19255
Rs1x=7.2
Rs1y=−46.89627
ks1y=0.1100811×10⁺⁴
ADs1y=−0.4087675×10⁻²
AEs1y=−0.3099995×10⁻⁴
ds=5.0
ns=1.55883
Rs2x=1.72305
Rs2y=−1.44673
ks2y=−4.351532
ADs2y=−0.3156074×10⁻¹
AEs2y=0.1910824×10⁻¹
WD=1.5

In this example, the centers of curvature of the cross-sectional shape 7 (spherical surface) and the cross-sectional shape 5 (spherical surface) of the beam shaper 2 in the X cross-section substantially coincide with a luminous point of the semiconductor laser source 1.

Figure 3:
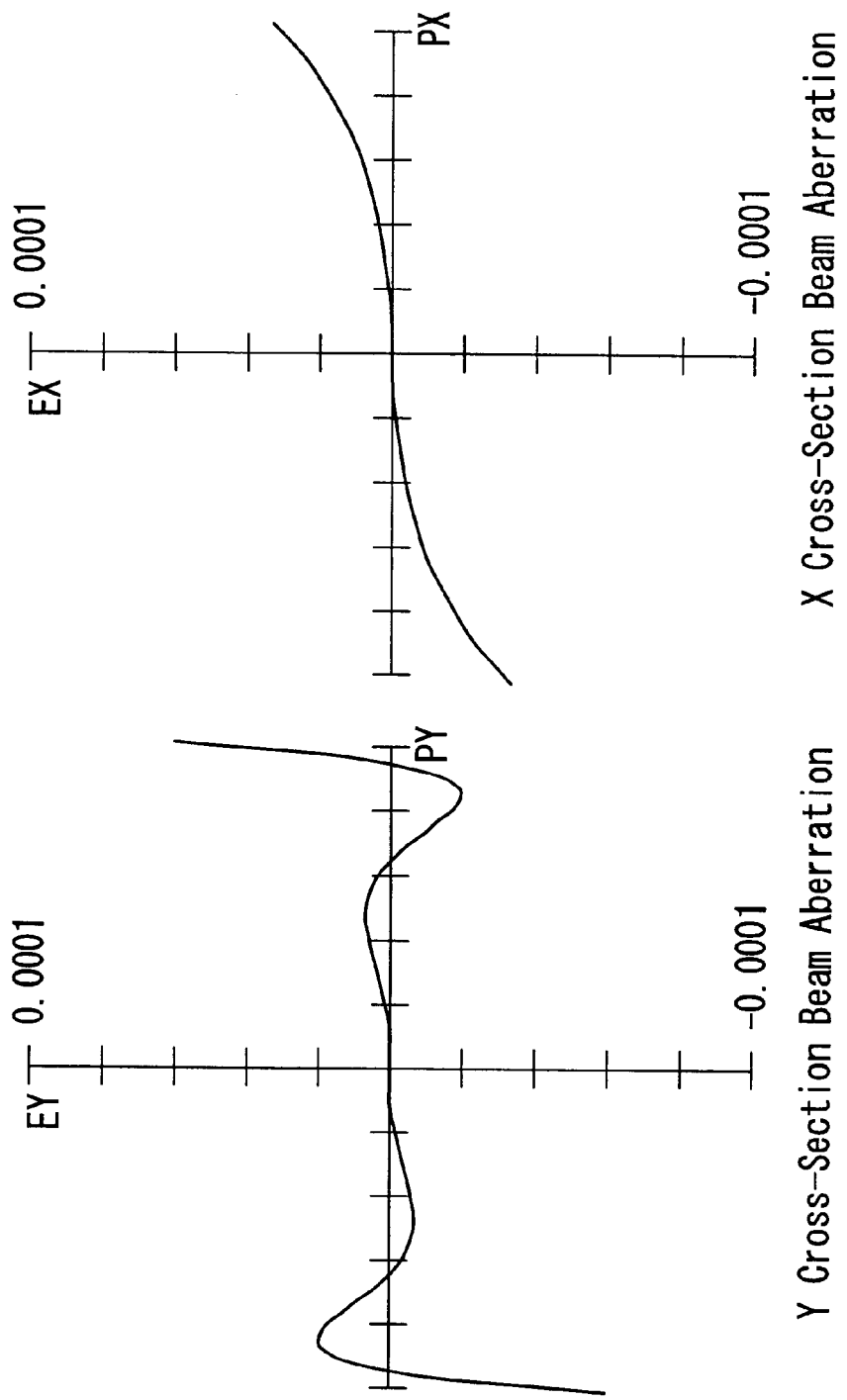
FIG. 3 shows transverse aberrations of the beam shaper according to Example 2 of the present invention.

FIG. 3 shows transverse aberrations of the beam shaper in this example. As can be seen from FIG. 3, the aberrations can be corrected sufficiently because the transverse aberrations are 0.0001 or less in both X cross-section and Y cross-section. Further, the RMS value concerning the total wavefront aberration is 0.005λ or less.

EXAMPLE 3

φEFF=4.40
fx=15.896
fy=5.7017
m=2.788
Rc1=11.6680
kc1=−0.7595541
ADc1=0.8786274×10⁻⁵
AEc1=−0.6558311×10⁻⁷
dc=3.0
nc=1.72925
Rc2: a plane
dk=7.9193
Rs1x=6.0
Rs1y=6.93259
ks1y=−1.714594
ADs1y=−0.6643176×10⁻³
AEs1y=0.1013347×10⁻³
ds=6.0
ns=1.72925
Rs2x=0.191947
Rs2y=−0.359417
ks2y=−4.184836
ADs2y=9.444115
AEs2y=0.0
WD=0.2

In this example, the centers of curvature of the cross-sectional shape 7 (spherical surface) and the cross-sectional shape 5 (spherical surface) of the beam shaper 2 in the X cross-section substantially coincide with a luminous point of the semiconductor laser source 1.

Figure 4:
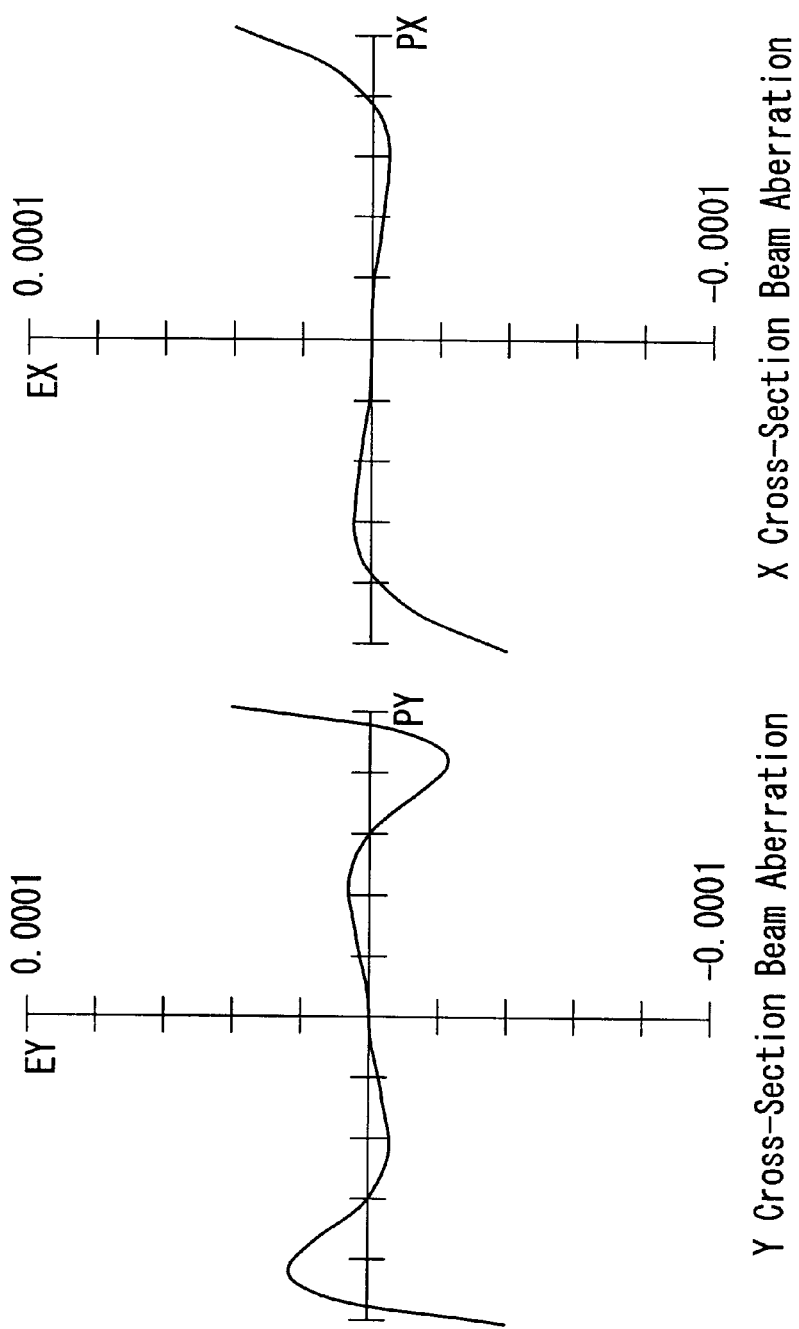
FIG. 4 shows transverse aberrations of the beam shaper according to Example 3 of the present invention.

FIG. 4 shows transverse aberrations of the beam shaper in this example. As can be seen from FIG. 4, the aberrations can be corrected sufficiently because the transverse aberrations are 0.0001 or less in both X cross-section and Y cross-section. Further, the RMS value concerning the total wavefront aberration is 0.005λ or less.

EXAMPLE 4

φEFF=4.40
fx=16.0
fy=10.6667
m=1.5
Rc1=10.76
kc1=−0.7866449
ADc=0.6845704×10⁻⁵
AEc1=0.1090476×10⁻⁶
dc=2.0
nc=1.61735
Rc2=−111.91
kc2=10.89531

ADc2=0.6774711×10⁻⁵
AEc1=0.2132815×10⁶
dk=10.06
Rs1x=3.8
Rs1y=7.82872
ks1y=−6.302197
ADs1y=−0.1670735×10⁻²
AEs1y=0.2577290×10⁻³
ds=3.0
ns=1.62392
Rs2x=1.186324
Rs2y=−11.99091
ks2y=150.2921
ADs2y=−0.1123077×10⁻¹
AEs2y=0.1684702×10⁻¹
WD=1.5

In this example, the centers of curvature of the cross-sectional shape 7 (spherical surface) and the cross-sectional shape 5 (spherical surface) of the beam shaper 2 in the X cross-section substantially coincide with a luminous point of the semiconductor laser source 1.

Figure 5:
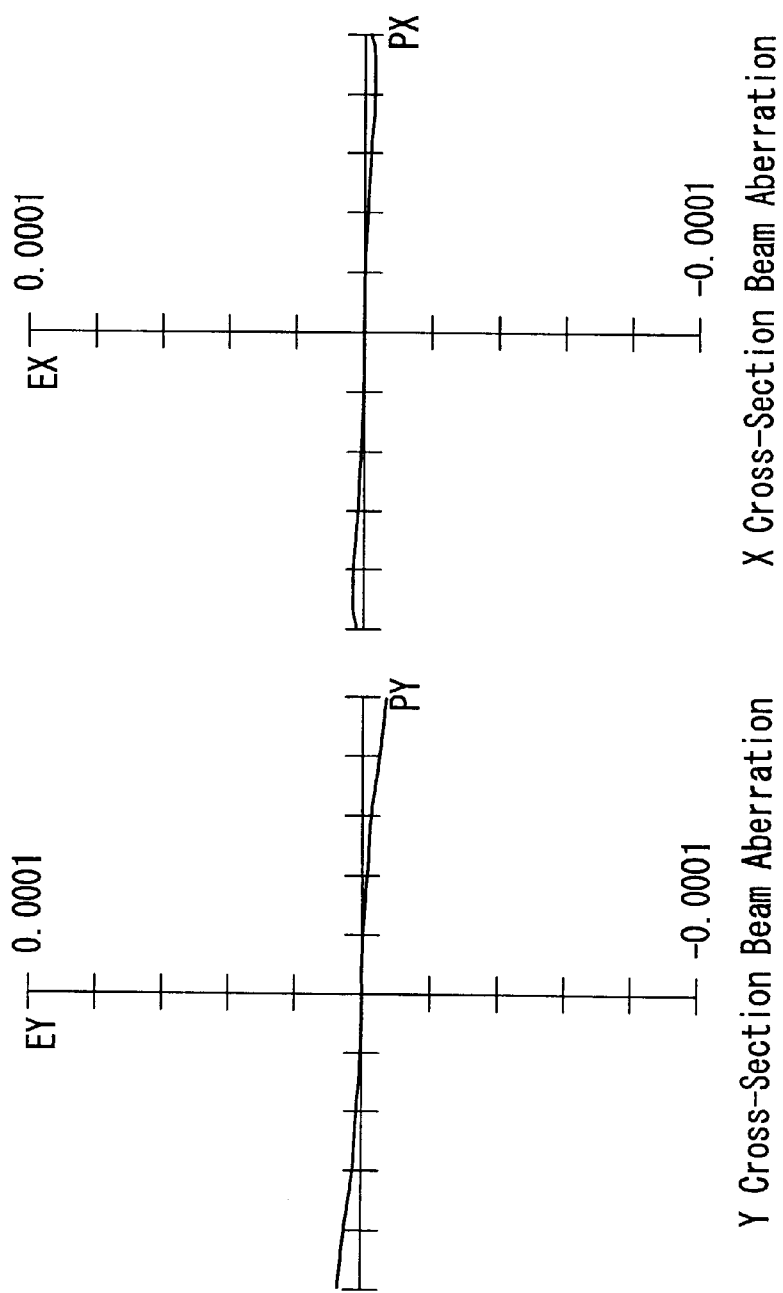
FIG. 5 shows transverse aberrations of the beam shaper according to Example 4 of the present invention.

FIG. 5 shows transverse aberrations of the beam shaper in this example. As can be seen from FIG. 5, the aberrations can be corrected sufficiently because the transverse aberrations are 0.0001 or less in both X cross-section and Y cross-section. Further, the RMS value concerning the total wavefront aberration is 0.005λ or less.

Figure 8:
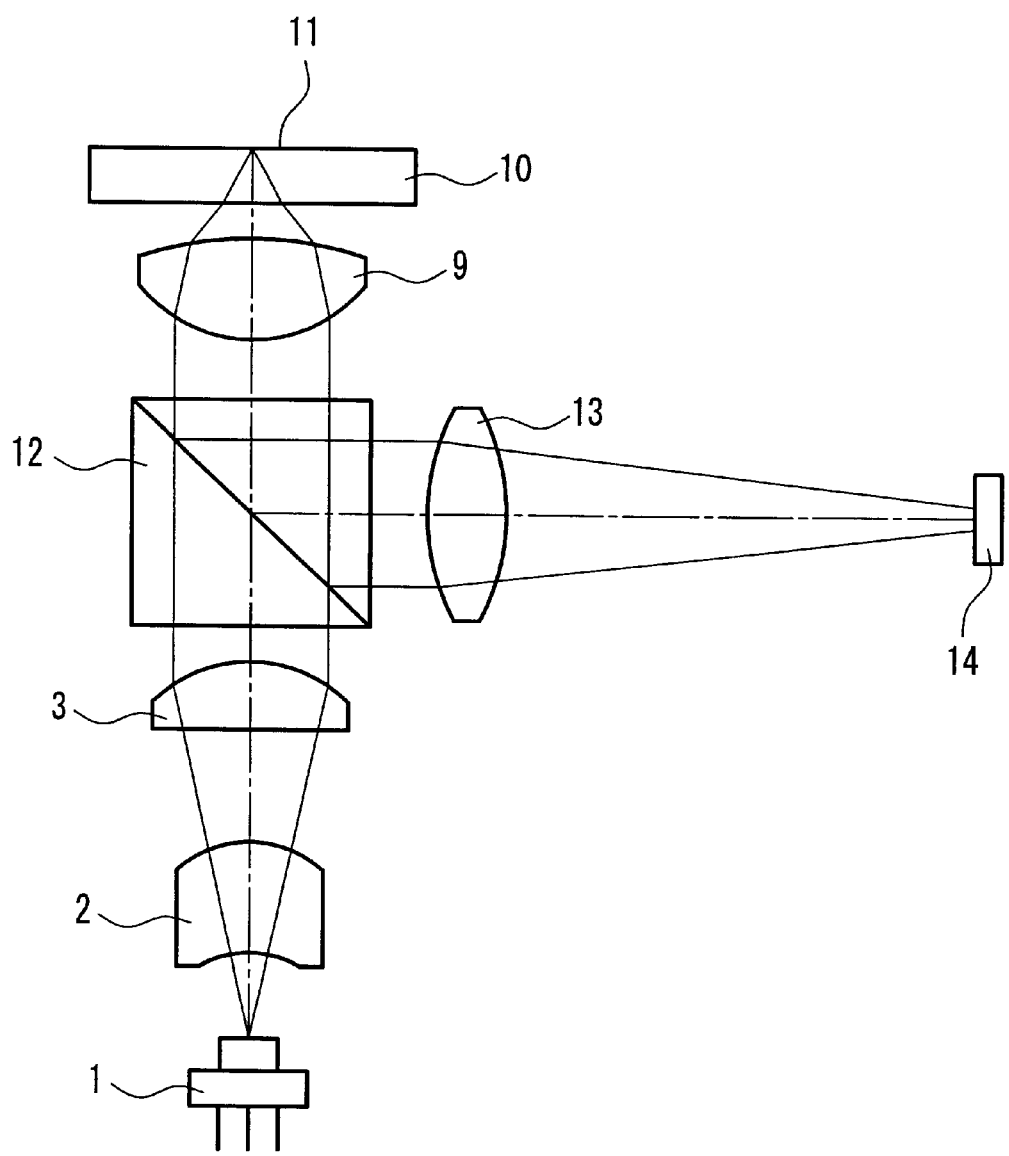
FIG. 8 is a schematic diagram showing a configuration of an optical head using a beam shaper according to one embodiment of the present invention.

FIG. 8 is a schematic diagram showing a configuration of an optical head using a semiconductor laser source device according to one embodiment of the present invention.

As shown in FIG. 8, a light beam emitted from the semiconductor laser source 1 passes through the beam shaper 2. Then, the light beam is converted into a parallel beam with the collimator lens 3, and converged onto an information medium surface 11 in an optical disk 10 by an objective lens 9. The light beam modulated on the information medium surface 11 is reflected and converted into a parallel beam by the objective lens 9 again. Then, a beam splitter 12 splits the parallel beam so as to have a part of the beam go along a different optical path from that toward the laser source. The beam split by the beam splitter 12 passes through a detecting lens 13 and forms a spot on a photodetector 14. Here, one surface of the detecting lens 13 is a toric surface, and this detecting lens 13 can generate an astigmatism. With this capability, a focal deviation can be detected using a quadratic photodetector 14 by a so-called astigmatism method. By giving feedback on the amount of deviation to the objective lens 9, the focus onto the information medium surface 11 of the optical disk 10 can be adjusted continuously.

In this optical head, the beam shaper 2 functions so as to narrow the luminous flux with a large beam divergence angle emitted from the semiconductor laser source 1, and therefore improves the efficiency of laser power with respect to the objective lens 9 having a circular aperture.

As stated above, the present invention can provide a beam shaper whose aberration variation is small but positioning tolerance is high, and also can provide a semiconductor laser source device and an optical head for which the efficiency of laser power can be improved.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A beam shaper that converts a luminous flux emitted from a semiconductor laser source whose beam divergence angle is different in a horizontal direction and a vertical direction into a luminous flux having a smaller difference, where a beam divergence angle in a far field from the semiconductor laser source is larger in the vertical direction and smaller in the horizontal direction, the beam shaper comprising a single lens whose both surfaces are toric surfaces,
   wherein
      both of the toric surfaces have aspheric surfaces in a cross-section in the vertical direction,
      both of the toric surfaces have spherical surfaces in a cross-section in the horizontal direction, and
      both centers of curvature of the spherical surfaces are located substantially at a luminous point of the semiconductor laser source.

2. The beam shaper according to claim 1, wherein
   the toric surfaces in the cross-section in the vertical direction are a convex surface at the side of the semiconductor laser source and a concave surface at the side opposite to the semiconductor laser source.

3. The beam shaper according to claim 1, wherein the following Formula 6 is satisfied:
[Formula 6]

$$1.2 < NAy/NAx < 3.0$$

where NAx and NAy represent numerical apertures, which the beam shaper can take in from the semiconductor laser source, in the cross-sections in the horizontal direction and the vertical direction, respectively.

4. A semiconductor laser source device comprising a semiconductor laser source and a beam shaper, where a beam divergence angle in a far field from the semiconductor laser source is larger in a vertical direction and smaller in a horizontal direction, the beam shaper comprising a single lens whose both surfaces are toric surfaces, wherein
      both of the toric surfaces have aspheric surfaces in a cross-section in the vertical direction,
      both of the toric surfaces have spherical surfaces in a cross-section in the horizontal direction, and
      both centers of curvature of the spherical surfaces are located substantially at a luminous point of the semiconductor laser source.

5. The semiconductor laser source device according to claim 4, further comprising a collimator lens that converts a luminous flux emitted from the beam shaper into a parallel beam.

6. The semiconductor laser source device according to claim 5, wherein
   an aberration correction for the collimator lens is made when the beam shaper is inserted between the collimator lens and the semiconductor laser source.

7. The semiconductor laser source device according to claim 4, wherein
   the toric surfaces in the cross-section in the vertical direction are a convex surface at the side of the semiconductor laser source and a concave surface at the side opposite to the semiconductor laser source.

8. The semiconductor laser source device according to claim 4, wherein the following Formula 7 is satisfied:
[Formula 7]

$$1.2 < NAy/NAx < 3.0$$

where NAx and NAy represent numerical apertures, which the beam shaper can take in from the semiconductor laser source, in the cross-sections in the horizontal direction and the vertical direction, respectively.

9. The semiconductor laser source device according to claim 4,
wherein
the beam shaper is made of resin, and
the semiconductor laser source and the beam shaper are fixed with a resin lens barrel.

10. An optical head comprising:
a semiconductor laser source device according to claim 4,
collecting means for collecting light emitted from the semiconductor laser source device onto an information medium,
light splitting means for splitting the light modulated on the information medium, and
light-receptive means for receiving the light modulated on the information medium.

11. The beam shaper according to claim 2, wherein the following Formula 6 is satisfied:

[Formula 6]

$$1.2 < NAy/NAx < 3.0$$

where NAx and NAy represent numerical apertures, which the beam shaper can take in from the semiconductor laser source, in the cross-sections in the horizontal direction and the vertical direction, respectively.

* * * * *